(12) United States Patent
Reiling et al.

(10) Patent No.: US 11,911,818 B2
(45) Date of Patent: Feb. 27, 2024

(54) METHOD FOR PRODUCING A MOTOR VEHICLE RIM MADE OF ALUMINIUM OR ALUMINIUM ALLOY FOR A WHEEL OF A MOTOR VEHICLE AND A CORRESPONDING DEVICE FOR PRODUCING A MOTOR VEHICLE RIM

(71) Applicant: AUDI AG, Ingolstadt (DE)

(72) Inventors: Jaan Mattes Reiling, Sassenberg (DE); Jan Gaugler, Neckarmühlbach (DE); Marc Hummel, Güglingen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/787,721

(22) PCT Filed: Dec. 8, 2020

(86) PCT No.: PCT/EP2020/085021
§ 371 (c)(1),
(2) Date: Jun. 21, 2022

(87) PCT Pub. No.: WO2021/144072
PCT Pub. Date: Jul. 22, 2021

(65) Prior Publication Data
US 2023/0022011 A1 Jan. 26, 2023

(30) Foreign Application Priority Data
Jan. 14, 2020 (DE) .......................... 102020100702.7

(51) Int. Cl.
*B21D 53/30* (2006.01)
(52) U.S. Cl.
CPC .................................. *B21D 53/30* (2013.01)

(58) Field of Classification Search
CPC .. B21D 53/30; B60B 3/06; B60B 3/10; B60B 2310/202; B60B 2360/104; B60B 2900/113; Y02T 10/86
See application file for complete search history.

(56) References Cited

U.S. PATENT DOCUMENTS

| 4,538,860 A | 9/1985 | Edwards et al. |
| 5,647,426 A * | 7/1997 | Prieto ................. B22D 15/005 |
| | | 164/312 |
| 2015/0074983 A1* | 3/2015 | Hubauer ................ B22D 39/00 |
| | | 29/527.5 |

FOREIGN PATENT DOCUMENTS

| CN | 102463335 A | 5/2012 |
| CN | 105499513 A | 4/2016 |

(Continued)

OTHER PUBLICATIONS

Machine Translation for DE19926573 A1 (Year: 2000).*
(Continued)

*Primary Examiner* — Moshe Wilensky
(74) *Attorney, Agent, or Firm* — Maier & Maier, PLLC

(57) ABSTRACT

A method for producing an automobile rim from aluminum or an aluminum alloy for a wheel of a motor vehicle. The automobile rim has a rim well delimited on opposite sides by an outer flange and an inner flange, a hub having a center recess and a bolt hole circle, and a rim center connecting the rim well and the hub to one another. The automobile rim is produced integrally and continuously in a casting mold by die casting of a casting material. After the introduction of the casting material into the casting mold, a volume of the casting mold is reduced for post-compaction of the casting material. The invention furthermore relates to a device for producing an automobile rim.

14 Claims, 1 Drawing Sheet

(56) References Cited

FOREIGN PATENT DOCUMENTS

| | | |
|---|---|---|
| DE | 4114985 A1 | 11/1992 |
| DE | 19926573 A1 | 12/2000 |
| DE | 69920810 T2 | 10/2005 |
| DE | 102005026829 A1 | 12/2006 |
| DE | 102006036369 B4 | 4/2009 |
| DE | 102008046803 A1 | 3/2010 |
| DE | 102012021886 B3 | 11/2013 |
| DE | 102016106256 B3 | 3/2017 |
| EP | 0301472 B1 | 4/1991 |
| EP | 2848333 A1 | 3/2015 |
| EP | 3162460 A1 | 5/2017 |
| JP | 8197228 A | 8/1996 |

OTHER PUBLICATIONS

German Examination Report dated Aug. 6, 2020, in connection with corresponding German Application No. 102020100702.7 (16 pp., including machine-generated English translation).

German Examination Report dated Nov. 23, 2020, in connection with corresponding German Application No. 102020100702.7 (16 pp., including machine-generated English translation).

International Preliminary Report on Patentability with English translation dated Jul. 19, 2022, in corresponding International Application No. PCT/EP2020/085021; 16 pages.

International Search Report with English translation dated Mar. 9, 2021, in corresponding International Application No. PCT/EP2020/085021; 6 pages.

\* cited by examiner

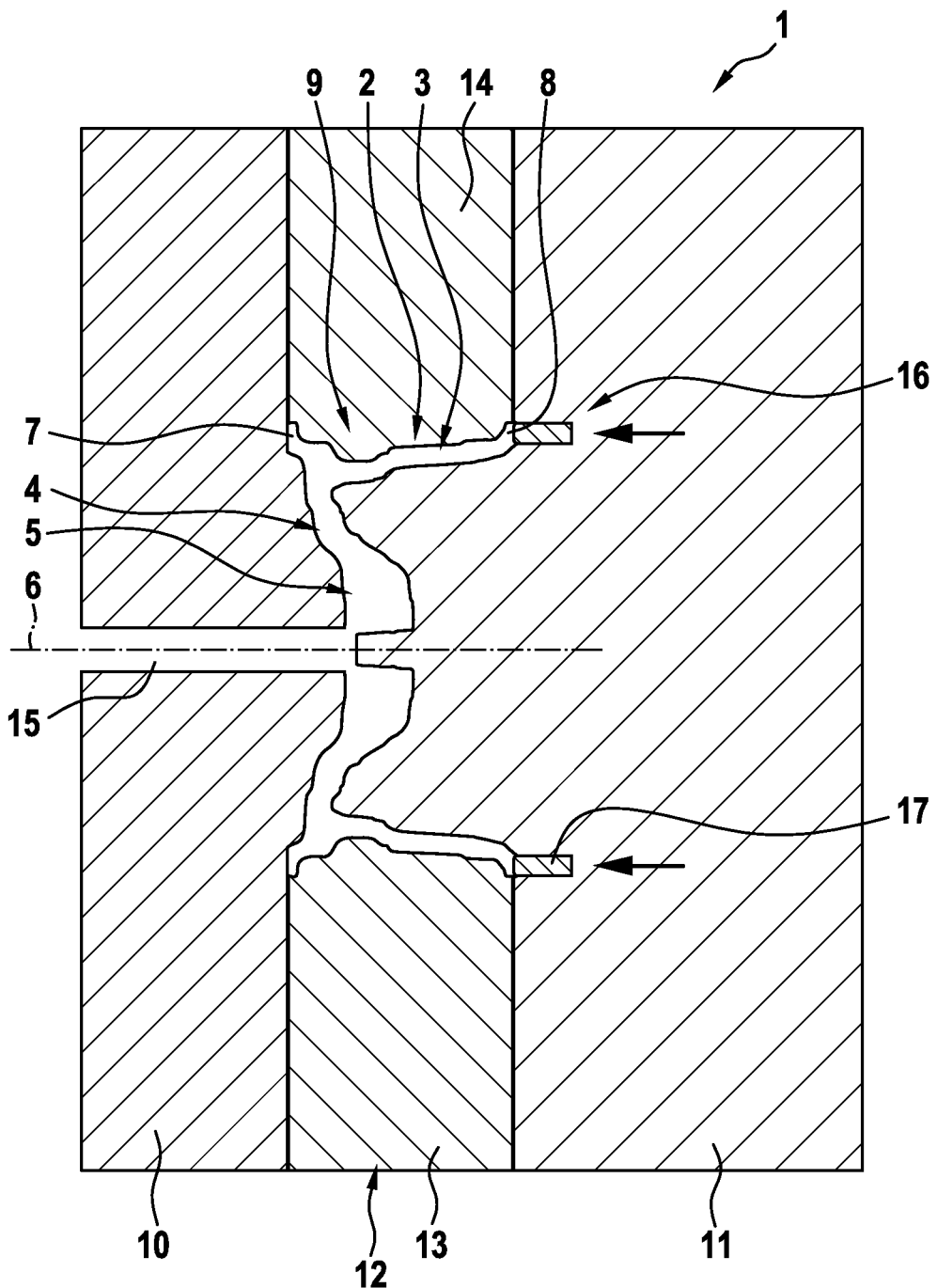

METHOD FOR PRODUCING A MOTOR VEHICLE RIM MADE OF ALUMINIUM OR ALUMINIUM ALLOY FOR A WHEEL OF A MOTOR VEHICLE AND A CORRESPONDING DEVICE FOR PRODUCING A MOTOR VEHICLE RIM

FIELD

The invention relates to a method for producing an automobile rim from aluminum or an aluminum alloy for a wheel of a motor vehicle, wherein the automobile rim has a rim well delimited on opposite sides by an outer flange and an inner flange, a hub having a central recess and a bolt hole circle, and a rim center connecting the rim well and the hub to one another and in particular engaging off-center on the rim well in longitudinal section. The invention furthermore relates to a device for producing an automobile rim.

BACKGROUND

Document EP 0 301 472B1 is known from the prior art, for example. This describes a production method for light metal cast wheels for passenger vehicles, wherein a near-eutectic refined AlSi alloy is used, which—in addition to Al—has weight components of 9.5% to 12.5% silicon and alloy components such as at most 0.2% iron, at most 0.05% manganese, at most 0.1% titanium, at most 0.03% copper, at most 0.05% zinc, and at most 0.05% each and at most 0.15% in total other contaminants, and wherein the wheels are removed from the casting mold after the solidification and cooled. It is provided here that the alloy contains at least 0.05% to at most 0.15% weight components magnesium and that the wheels are quenched in water from a temperature—measured at their surface—of at least 380° C. at inner regions or regions having mass concentrations, such as hub and disks of wheels, immediately upon removal from the casting mold.

SUMMARY

It is the object of the invention to propose a method for producing an automobile rim from aluminum or an aluminum alloy for a wheel of a motor vehicle, which has advantages over known such methods, in particular enables a particularly rapid and cost-effective production of the automobile rim having particularly filigree structures and a particularly good microstructure.

This is achieved by a method for producing an automobile rim. It is provided that the automobile rim is produced integrally and continuously in a casting mold by die casting of a casting material, wherein after the introduction of the casting material into the casting mold, a volume of the casting mold is reduced for post compaction of the casting material.

The automobile rim is typically part of the wheel of the motor vehicle, wherein multiple wheels are arranged on the motor vehicle, which each have such an automobile rim. The motor vehicle is provided in the form of an automobile and thus has more than two wheels, in particular precisely four wheels. The automobile rim is explicitly provided and designed for use in such a motor vehicle designed as an automobile. The automobile rim is thus not provided as a generic motor vehicle rim, but rather is intended for use on the automobile and is designed accordingly.

The automobile rim has as essential components the rim well, the rim center, and the hub. The rim well and the hub are connected to one another via the rim center, wherein at least the rim well, the rim center, and the hub are formed integrally and of the same material with one another. The rim well, the rim center, and the hub are produced simultaneously with one another for this purpose, namely during a single production step. It is thus not provided that the rim well, the rim center, and the hub are to be produced separately from one another and fastened on one another later. Rather, the production takes place jointly, namely by the die casting of the casting material in the casting mold.

The automobile rim has a longitudinal center axis, which in particular corresponds to a longitudinal center axis of the hub and preferably coincides or at least nearly coincides with a later axis of rotation of the wheel. Viewed in the axial direction with respect to this longitudinal center axis, the rim well is delimited on opposite sides by the outer flange and the inner flange. The outer flange and the inner flange are thus provided on opposite sides of the rim well and enclose a tire receptacle region of the automobile rim between them viewed in longitudinal section with respect to the longitudinal center axis. The tire receptacle region is used to accommodate a tire which, together with the automobile rim, forms the wheel. The tire receptacle region is delimited in the radial direction on the inside by the rim well and in the axial direction on opposite sides by the outer flange and the inner flange.

The entire automobile rim is particularly preferably delimited in the axial direction or viewed in longitudinal section in a first direction by the outer flange and in a second direction by the inner flange, so that the outer flange and the inner flange define an overall extension of the automobile rim in the axial direction, corresponding to a width of the automobile rim. During an installation of the wheel on the motor vehicle, the wheel is rotatably mounted via a wheel bearing on a wheel carrier. The outer flange is provided after the installation of the wheel on the motor vehicle on a side of the automobile rim facing away from the wheel carrier and the inner flange is provided on a side of the automobile rim facing toward the wheel carrier.

The outer flange and the inner flange are provided in the form of a radial projection originating from the rim well, which extends from the rim well in the radial direction outward, again in relation to the longitudinal center axis of the automobile rim. Of course, the outer flange and the inner flange are formed integrally and of the same material with the remainder of the automobile rim, in particular the rim well, the rim center, and the hub. They are thus formed simultaneously with them during the die casting.

The hub has the center recess and the bolt hole circle. The center recess is a central recess for accommodating a wheel hub of the motor vehicle, on which the wheel is fastened during the installation on the motor vehicle. The wheel hub is rotatably mounted via the wheel bearing on the wheel carrier. The bolt hole circle consists of multiple drilled holes arranged along an imaginary circle which are each used to accommodate a fastening means, with the aid of which the automobile rim is fastened on the wheel hub. The fastening means is provided, for example, in the form of a screw, a bolt, or the like.

The rim well and the hub are connected to one another via the rim center. The rim center is thus provided between the rim well and the hub viewed in the radial direction with respect to the longitudinal center axis. It extends, viewed in the radial direction, from the hub to the rim well. For example, the rim center has multiple spokes which are arranged or formed spaced apart from one another in the circumferential direction. The rim center can, however, also be made continuous in the circumferential direction, in particular completely.

The rim center engages off-center on the rim well, for example, viewed in the axial direction or in longitudinal section. This means that it merges into the rim well beyond a center point thereof in the axial direction. The rim center preferably engages at a distance from the center point of the rim well in the axial direction which, in relation to a total extension of the rim well in the axial direction, is at least 10%, at least 20%, at least 30%, at least 40%, or more. For example, the rim center, viewed in the axial direction, merges at the end of the rim well therein. In this case, the rim center merges, viewed in the axial direction, in overlap with the outer flange or the inner flange, preferably the former, into the rim well. Due to the rim center engaging off-center on the rim well, not only a force in the radial direction, but additionally a bending torque in the axial direction or in an imaginary plane accommodating the longitudinal center axis of the automobile rim acts on the rim center after the installation of the wheel on the motor vehicle. Due to this it was previously necessary to form the rim center as correspondingly solid with high material use. The rim center can alternatively also engage centrally on the rim well and/or the hub.

Viewed in longitudinal section, the rim well preferably has a greater extension in the axial direction than the rim center and the hub. In particular, the axial extension of the rim well is greater than the axial extension of the hub, which is in turn greater than the axial extension of the rim center. For example, the axial extension of the hub in relation to the axial extension of the rim well is at most 50%, at most 40%, at most 30%, at most 25%, or at most 20%. The axial extension of the rim center in relation to the axial extension of the hub is, for example, at most 25%, at most 20%, at most 15%, at most 10%, or at most 5%. By way of the mentioned dimensions, a receptacle enclosed by the rim well is provided for the wheel hub and/or a brake disk fastened on the wheel, wherein the wheel hub and/or the brake disk are present in this receptacle after the installation of the wheel on the motor vehicle. This is the case in particular with the off-center engagement of the rim center on the rim well.

The automobile rim consists continuously and uniformly in material of the casting material, namely the aluminum or—preferably—the aluminum alloy. This is processed by the die casting. In the die casting, the casting mold is used by means of which the automobile rim and thus at least the rim well together with the outer flange and the inner flange, the rim center, and the hub are formed. The central recess, which can also be referred to hereinafter as the wheel hub receptacle, is also preferably at least partially formed during the die casting.

The die casting can be carried out, for example, at normal pressure or as vacuum die casting. The vacuum die casting is distinguished in that the casting mold is at least partially evacuated before and/or during the introduction of the casting material into the casting mold. This means that a negative pressure is applied to the casting mold before and/or during the introduction of the casting material. The negative pressure is to be understood here as a pressure which is lower than an introduction pressure at which the casting material is introduced into the casting mold and/or an ambient pressure in the external surroundings of the casting mold. For example, the negative pressure in relation to the external pressure is at most 50%, at most 25%, at most 10%, or at most 5%. For example, the residual pressure is between 50 mbar and 200 mbar. The residual pressure is to be understood as the absolute pressure in the casting mold.

The evacuation of the casting mold is carried out, for example, by means of a negative pressure source, which is placed in a fluidic connection for this purpose with the casting mold. In particular, the casting mold is already evacuated before the introduction of the casting material. For example, the introduction of the casting material takes place upon, in particular only upon reaching a specific negative pressure or residual pressure in the casting mold. Additionally or alternatively, the casting mold can be evacuated during the introduction of the casting material, thus the flow connection between the negative pressure source and the casting mold is maintained during the introduction of the casting material into the casting mold and the negative pressure source is operated further to evacuate the casting mold. Particularly filigree structures of the automobile rim can be produced in this way.

For example, it is provided that the casting mold is initially sealed off by means of at least one seal, for example, using a sealing cord, in particular a silicone sealing cord. Subsequently, the casting material is metered into a casting chamber which is fluidically connected to the casting mold. For this purpose, the casting chamber is at least temporarily fluidically connected to a crucible, in which the molten casting material is stored. The negative pressure is then applied to the casting mold and the casting material located in the casting chamber is displaced into the casting mold, in particular by means of a pressurized piston. The fluidic connection between the casting chamber and the crucible preferably exists simultaneously, in particular continues to exist. This means that the evacuation of the casting chamber also takes place during the introduction of the casting material.

The automobile rim produced by means of the die casting is distinguished, for example, by a particularly low wall thickness. Such a wall thickness is only possible due to the die casting. However, the low wall thickness requires at least in regions a low mass flow of the casting material into the casting mold. To nonetheless ensure an outstanding microstructure of the produced automobile rim, the post-compaction of the casting material is therefore to take place. In this way, in particular shrinkage porosity of the automobile rim can be reliably avoided.

The post-compaction of the casting material takes place after the introduction of the casting material, in particular after the complete filling of the casting mold with the casting material. The post-compaction is carried out by reducing the volume of the casting mold, so that the casting material present in the casting mold is compressed. For example, the post-compaction of the casting material or the reduction of the volume of the casting mold does not take place immediately upon reaching complete filling of the casting mold by the casting material, but rather with a time interval in relation thereto. For example, the post-compaction is carried out as a function of a temperature of the casting material present in the casting mold.

In particular, the post-compaction is first performed when the casting material is already partially solidified, thus is no longer present in the completely liquid state. For example, it is provided that the casting material is introduced at a casting temperature into the casting mold. The post-compaction is carried out only when or precisely when the casting material present in the casting mold in regions has a first temperature which is less than a solidus temperature of the casting material, and in regions has a second temperature which at least corresponds to the solidus temperature. For example, the proportion of the casting material which has the first temperature during the post-compaction is less than the proportion of the casting material which has the second temperature. In this way, the microstructure of the casting material is changed once again in the partially solidified state, which extremely positively influences the fatigue strength of the automobile rim.

For example, it can also be provided that the introduction of the casting material is begun with already decreased volume of the casting mold and the volume of the casting mold is enlarged during the introduction of the casting material to generate a suction effect on the casting material. With such a procedure, complete filling of the casting mold with the casting material is achieved particularly reliably. After the introduction of the casting material, the reduction of the volume of the casting mold takes place in turn for the purpose of the post-compaction, as already explained. The post-compaction is effectuated, for example, by the retraction of a compaction tool into the casting mold.

The compaction tool can be moved, for example—with respect to the longitudinal center axis of the automobile rim—precisely in the axial direction, precisely in the radial direction, or in a direction angled at an angle in relation to the axial direction, wherein the angle is greater than 0° and less than 90°.

The described procedure during the production of the automobile room enables a simple, fast, and cost-effective formation of the motor vehicle rim, which at the same time has an extremely filigree structure. The fast production is achieved in particular by the die casting, in the case of which significantly faster filling of the casting mold takes place than with chill casting or low-pressure casting, which is normally used to produce automobile rims. Overall, the pace during the production of the automobile rim may be significantly increased by the die casting, so that a greater number of automobile rims is producible in the same time span. The solidification time for the die casting is also significantly shorter than for chill casting.

One refinement of the invention provides that the compaction is carried out by retracting a compaction tool into the casting mold. The casting mold itself has a rigid external contour, which is thus not deformable to reduce its volume. Rather, the volume of the casting mold is to be carried out solely by the retraction of the compaction tool. The compaction tool is thus arranged in a first position in such a way that it occupies a first displacement volume in the casting mold, and in a second position in such a way that it occupies a second displacement volume in the casting mold. The second displacement volume is greater than the first displacement volume for this purpose.

It can be provided that the compaction tool is arranged in the first position outside the casting mold, so that the first displacement volume is equal to zero. In the second position, in contrast, the displacement volume is always greater than zero in order to reduce the volume of the casting mold by the displacement volume. The retraction of the compaction tool is carried out, for example, precisely in the axial direction or precisely in the radial direction, each in relation to the longitudinal center axis of the automobile rim. However, an oblique retraction can also be performed, in which the retraction takes place in a direction angled by an angle with respect to the axial direction. The angle is greater than 0° and less than 90° for this purpose.

The compaction tool can be designed as desired in principle, as long as it effectuates different displacement volumes in the casting mold in the different positions. For example, the displacement tool is provided in the form of a piston, which is in particular cylindrical, preferably circularly cylindrical. The use of the compaction tool has the advantage that the reduction of the volume of the casting mold is possible in a particularly simple manner.

One refinement of the invention provides that a ring projection or a contour shape is used as the compaction tool. The ring projection is distinguished by its ring formation, which is preferably provided continuously in the circumferential direction with respect to a longitudinal center axis of the automobile rim. The ring projection thus completely and continuously encloses the longitudinal center axis in the circumferential direction. The ring projection is preferably introduced into the casting mold in the axial direction with respect to the longitudinal center axis. To displace the ring projection from the first position into the second position and vice versa, the ring projection is thus displaced in the axial direction and thus in parallel to the longitudinal center axis of the automobile rim. The displacement preferably takes place in such a way that a longitudinal center axis of the ring projection always coincides with the longitudinal center axis of the automobile rim.

The ring projection differs from the contour shape in particular in that it only partially overlaps an end face of the automobile rim. For example, an end face of the automobile rim is defined by a plate of a device for producing the automobile rim, so that the plate thus delimits the casting mold. The compaction tool is only retracted by the plate or from the plate into the casting mold to reduce its volume. During and after the retraction of the ring projection, the automobile rim formed in the casting mold only rests partially on the ring projection and furthermore partially on the plate of the device defining the end face of the automobile rim.

In contrast, the contour shape defines the entire end face of the automobile rim. Due to the retraction of the contour shape into the casting mold or the displacement of the contour shape to reduce the volume of the casting mold, the dimensions of the casting mold thus change and accordingly the dimensions of the automobile rim change between its two end faces. For example, the rim well has a first extension in the axial direction before the displacement of the contour shape, which is reduced by the displacement of the contour shape until after the displacement of the contour shape only a second extension of the rim well is present in the axial direction which is less than the first extension. Such a procedure enables particularly effective compaction of the casting material present in the casting mold.

One refinement of the invention provides that the ring projection is retracted into the casting mold in such a way that a ring recess with borders on both sides is formed in the automobile rim. The ring projection is preferably retracted in the axial direction into the casting mold. For this purpose, it is arranged in such a way that it engages in one end face of the automobile rim, namely in such a way that it is spaced apart both from a delimitation of the end face on the inside in the radial direction and also from a radially exterior delimitation of the end face. Accordingly, the ring recess is formed by the ring projection in the automobile rim, which has borders on the inside and on the outside viewed in the radial direction with respect to the longitudinal center axis of the automobile rim, thus has a border. The ring recess is thus provided, for example, in the form of a ring groove in the automobile rim. Uniform post compaction of the casting material is achieved in this way.

One refinement of the invention provides that the contour shape continuously forms an axial end face of the automobile rim and is retracted into the casting mold with reduction of an extension of the automobile rim in the axial direction. This was already mentioned beforehand. The axial end face is to be understood as the above-mentioned end face of the automobile rim which delimits the automobile rim at least in regions in the axial direction. Due to the retraction of the contour shape, the extension of the casting mold in the axial direction and thus the extension of the automobile rim is reduced. The advantages achieved in this way were also already discussed above. Preferably, upon the reduction of the extension of the automobile rim in the axial direction, an extension of the rim well between the outer flange and the inner flange is kept constant, so that, for example (only) the extension of the inner flange is reduced.

One refinement of the invention provides that the casting mold has at least one first outlet opening and at least one second outlet opening arranged spaced apart in the axial direction with respect to a longitudinal center axis of the automobile rim from the at least one first outlet opening, at each of which a casting material can exit from the casting mold. The casting mold has multiple outlet openings, namely the at least one first outlet opening and the at least one second outlet opening. The first outlet opening and the second outlet opening are arranged in multiple rows viewed in longitudinal section with respect to the longitudinal center axis and are thus provided spaced apart from one another in the axial direction. In particular, the first outlet opening and the second outlet opening are located on opposite sides of an imaginary plane extending through the automobile rim, wherein the imaginary plane is preferably perpendicular to the longitudinal center axis of the automobile rim. For example, the imaginary plane intersects the automobile rim centrally viewed in longitudinal section, thus is provided in the form of a center point plane.

The outlet openings, thus both the first outlet opening and also the second outlet opening, are preferably each arranged spaced apart from the imaginary plane in the axial direction. In particular, the first outlet opening, viewed in longitudinal section with respect to an axial extension of the automobile rim, is arranged at most 10%, at most 15%, at most 20%, or at most 25% from a first end face of the automobile rim and the second outlet opening is arranged at most 10%, at most 15%, at most 20%, or at most 25% from a second end face of the automobile rim different from the first end face. The end faces are to be understood as two end faces of the automobile rim facing away from one another. For example, the first end face is provided on a side of the outer flange facing away from the inner flange and the second end face is provided on a side of the inner flange facing away from the outer flange.

The first outlet opening particularly preferably borders the first end face and/or the second outlet opening borders the second end face or in each case is located therein. The first outlet opening particularly preferably adjoins the outer flange on the side thereof facing away from the rim well. Additionally or alternatively, the second outlet opening adjoins the inner flange on the side thereof facing away from the rim well. The outlet openings are to be understood as overflow openings through which a part of the casting material introduced in the casting mold can exit from the casting mold during the die casting. A uniform distribution of the casting material in the casting mold is achieved in this way.

It was already explained above that the outlet openings are arranged in multiple rows. If the first outlet opening is part of multiple outlet openings and the second outlet opening is part of multiple second outlet openings, all of the first outlet openings are thus each provided in the first row and all of the second outlet openings are provided in a second row. In other words, all first outlet openings are located in an imaginary first plane and all second outlet openings are located in an imaginary second plane, wherein the two planes are each preferably perpendicular to the longitudinal center axis of the automobile rim.

The multi-row arrangement of the outlet openings has the advantage that the flow speed of the casting material into the casting mold during the die casting is increased in regions, so that reliable and uniform filling of the casting mold with the casting material is ensured. The discard rate, thus the proportion of flawed automobile rims, can be significantly reduced in this way. The described procedure during the production of the automobile rim thus enables a simple, fast, and cost-effective formation of the automobile rim.

One refinement of the invention provides that a casting mold is used in which the first outlet opening and/or the second outlet opening is/are formed continuously in the circumferential direction. The first outlet opening or the second outlet opening is thus made ring-shaped and completely and continuously encloses the longitudinal center axis of the automobile rim in the circumferential direction. This can be the case for the first outlet opening, the second outlet opening, or both. A particularly uniform distribution of the casting material in the casting mold is achieved in this way.

One refinement of the invention provides that a casting mold is used in which the first outlet opening is provided on the inner flange and the second outlet opening is provided on the outer flange, so that the rim well is arranged in the axial direction between the first outlet opening and the second outlet opening. This was already mentioned above. The rim well typically has a low wall thickness, for example, a wall thickness of at most 15 mm, at most 10 mm, at most 7.5 mm, or at most 5 mm. This means that during the die casting, casting material introduced into the casting mold flows through the region of the casting mold in which the rim well is formed with only a low mass flow of the casting material. To nonetheless achieve the uniform filling of the casting mold, the two-row arrangement of the outlet opening is implemented.

One refinement of the invention provides that a negative pressure is applied to the casting mold during the die casting at the first outlet opening and/or the second outlet opening, in particular simultaneously or offset in time. This means that the first outlet opening, the second outlet opening, or both are connected to the negative pressure source and during the die casting or during the introduction of the casting material into the casting mold, a fluidic connection is established between the negative pressure source, on the one hand, and the first outlet opening, the second outlet opening, or both, on the other hand. It can be provided that the evacuation of the casting mold taking place before the introduction of the casting material into the casting mold also takes place via the first outlet opening and/or the second outlet opening. Accordingly, no further connections of the negative pressure source to the casting mold are necessary in addition to the first outlet opening and the second outlet opening.

The application to the first outlet opening and the second outlet opening during the die casting or during the introduction of the casting material into the casting mold can take place in different ways. For example, the negative pressure is applied to the two outlet openings simultaneously. However, a time-offset application can also be provided, in which, for example, initially the negative pressure is applied to the first outlet opening, whereas the fluidic connection between the second outlet opening and the negative pressure source is interrupted. Subsequently, the fluidic connection between the first outlet opening and the negative pressure source is interrupted and instead the fluidic connection between the second outlet opening and the negative pressure source is established, so that now the negative pressure is applied to the second outlet opening.

It is particularly preferably provided that negative pressure is only applied to the first outlet opening until the casting material has reached the first outlet opening or a certain quantity of casting material has exited from the first outlet opening. Subsequently, the application of negative pressure to the first outlet opening is stopped, in particular by interrupting the fluidic connection between the negative pressure source and the first outlet opening. Instead, the negative pressure is subsequently applied to the second outlet opening, namely preferably until the casting mold is completely filled with the casting material, thus the casting material has reached the second outlet opening or a specific quantity of the casting material has exited through the second outlet opening from the casting mold. Particularly reliable filling of the casting mold with the casting material is again achieved in this way.

One refinement of the invention provides that the die casting is carried out in such a way that the automobile rim at least in regions has a low wall thickness of at most 15 mm, and/or has a curvature having a low radius of curvature of at most 4 mm, and/or has a demolding surface extending in the axial direction and in the radial direction and/or in the axial direction and in the tangential direction with respect to a longitudinal center axis of the automobile rim, which lies completely in an imaginary plane, wherein the plane encloses an angle with the longitudinal center axis which is greater than 0° and at most 4°.

The automobile rim produced by means of the die casting is distinguished by a particularly low wall thickness and/or a curvature having a particularly low radius of curvature and/or by the presence of the demolding surface. The wall thickness is to be understood as the thickness of the wall of the automobile rim at least one point. The low wall thickness can thus be provided, for example, at the rim well, the outer flange, the inner flange, the rim center, and/or the hub. The low wall thickness is particularly preferably provided at the rim center. The low wall thickness particularly preferably represents the greatest wall thickness, for example, the greatest wall thickness of the outer flange, the greatest wall thickness of the inner flange, and/or the greatest wall thickness of the rim center. Of course, it can also be the greatest wall thickness of the rim well and/or the hub.

The low wall thickness is at most 15 mm, at most 10 mm, at most 7.5 mm, or at most 5 mm, but is preferably less. It is thus, for example, at most 4 mm, at most 3 mm, at most 2 mm, or at most 1.5 mm Vice versa, the low wall thickness is particularly preferably at least 1.5 mm or at least 2 mm. In other words, the low wall thickness is, for example, at least 1.5 mm and at most 5 mm, at least 1.5 mm and at most 4 mm, at least 1.5 mm and at most 3 mm, at least 1.5 mm and at most 2 mm, or approximately or precisely 1.5 mm. However, it can also be at least 2 mm and at most 5 mm, at least 2 mm and at most 4 mm, at least 2 mm and at most 3 mm, or precisely 2 mm.

Additionally or alternatively to the low wall thickness, the curvature having the low radius of curvature is provided. The curvature is a curvature of an outer surface or an outer circumferential surface of the automobile rim. The outer surface delimits a wall of the automobile rim to the outside. The curvature can be provided at an arbitrary point of the automobile rim, for example, at the rim well, the outer flange, the inner flange, the rim center, and/or the hub. The curvature is in particular a transition curvature between two surfaces which—viewed in section—are angled in relation to one another and are provided, for example, as planar surfaces.

The curvature preferably extends over an angle of at least 30°, at least 45°, at least 60°, or at least 90°. The curvature has a low radius of curvature which is at most 4 mm, but is preferably less. For example, the low radius of curvature thus corresponds, for example, to a radius of curvature of at most 3 mm, at most 2 mm, at most 1.5 mm, or at most 1 mm. Radii of curvature of at most 2 mm or less are preferred. Vice versa, the radius of curvature can additionally be at least 0.25 mm, at least 0.5 mm, or at least 0.75 mm.

Additionally or alternatively to the low wall thickness and/or the curvature having the low radius of curvature, the automobile rim can have the demolding surface. The demolding surface is to be understood as a flat surface which presses directly against the casting mold during the die casting and along which the demolding of the automobile rim from the casting mold takes place after the die casting. The demolding surface has an extension at least in the axial direction and in the radial direction and/or—additionally or alternatively—in the axial direction and in the tangential direction, each with respect to the longitudinal center axis of the automobile rim. In each case, the demolding surface thus has an extension in two directions perpendicular to one another and is thus located completely in the imaginary plane.

The demolding of the automobile rim thus takes place in the same direction. For example, a part of the casting mold is displaced after the die casting in the direction of the longitudinal center axis, thus in the axial direction, for opening the casting mold and for removing the automobile rim from the casting mold. This means that a casting mold surface of the casting mold which presses against the demolding surface during the die casting and forms it is displaced after the die casting along the longitudinal center axis. In a conventional method for producing an automobile rim, a demolding angle, thus an angle present between the demolding surface and the longitudinal center axis, has to be at least 5° to ensure proper demolding.

Because of the integral and continuous formation of the automobile rim by die casting from aluminum or the aluminum alloy, however, a significantly smaller angle is implementable. The angle between the demolding surface or between the plane completely accommodating the demolding surface and the longitudinal center axis is thus between infinitesimally greater than 0° and 4°, these values each being inclusive. It can thus be provided that the demolding surface extends nearly in parallel to the longitudinal center axis, so that during the demolding, a nearly parallel displacement of the casting mold surface and the demolding surface occurs. The angle of 0° is to be understood to mean that the plane and the longitudinal center axis lie one inside the other or extend in parallel to one another. The angle is, for example, at least 0.5°, at least 1°, or at least 1.5°. An angle of 4° is provided at most, however. For example, the angle is at most 3°, at most 2.0°, at most 1.5°, at most 1.0°, or at most 0.5°. The small angles of at most 2.0° and less are preferred here.

One refinement of the invention provides that the rim center is formed having multiple spokes spaced apart from one another in the circumferential direction with respect to a longitudinal center axis of the automobile rim. Such a design of the rim center is applied in particular for weight reduction of the automobile rim, but also to achieve better damping. The rim center is thus not formed solidly and continuously in the circumferential direction, but rather is composed of the multiple spokes which are arranged spaced apart from one another in the circumferential direction. Preferably, each of the multiple spokes extends from the hub in the radial direction up to the rim well, thus connects the hub and the rim well to one another. For example, at least three spokes, at least four spokes, at least five spokes, or at least six spokes are provided. For example, at least 10, at least 14, or at least 18 spokes are implemented. Preferably, at most 30 spokes or at least 20 spokes are provided. For example, each one of the spokes extends in the circumferential direction over at most 30° or less, preferably at most 15° or at most 10°.

It can be provided that the spokes have a constant extension in the circumferential direction, thus starting from the rim well up to the hub. However, branching of at least one of the spokes or multiple or each of the spokes can also be provided, so that the respective spoke divides into multiple partial spokes. For example, the spoke first extends starting from the hub in the radial direction outward and divides at a division point into multiple partial spokes, which extend away one another, in particular in the circumferential direction. After the division point, the partial spokes thus extend spaced apart from one another up to the rim well and engage thereon spaced apart from one another. It can be provided that a longitudinal center axis of at least one of the spokes, in particular the longitudinal center axes of multiple or all spokes, intersect the longitudinal center axis of the automobile rim or are even perpendicular thereto. A particularly optimal force introduction from the rim center or from the spokes into the hub is achieved in this way.

The invention furthermore relates to a device for producing an automobile rim from aluminum or an aluminum alloy for a wheel of a motor vehicle, in particular for carrying out the method according to the embodiments in the scope of this description, wherein the automobile rim has a rim well delimited on opposite sides by an outer flange and an inner flange, a hub having a central recess and a bolt hole circle, and a rim center which connects the rim well and the hub to one another and in particular engages off-center on the rim well in longitudinal section. It is provided here that the device is provided and designed to produce the automobile rim integrally and continuously in a casting mold by die casting of a casting material, wherein after the introduction of the casting material into the casting mold, a volume of the casting mold is reduced for post-compaction of the casting material.

The advantages of such a design of the device or such a procedure were already noted. Both the device and also the method for its operation can be refined according to the embodiments in the scope of this description, so that reference is insofar made thereto.

BRIEF DESCRIPTION OF THE FIGURE(S)

The invention is explained in more detail hereinafter on the basis of the exemplary embodiments illustrated in the drawing, without restricting the invention. The single FIGURE shows a schematic longitudinal sectional view through an automobile rim along a longitudinal center axis of the automobile rim.

DETAILED DESCRIPTION

The FIGURE shows a schematic sectional view through a device 1 for producing automobile rims 2 for a motor vehicle. Each of the automobile rims 2 has as essential components a rim well 3, a rim center 4, and a hub 5. The device 1 and the automobile rim 2 are shown in longitudinal section with respect to a longitudinal center axis 6 of the automobile rim 2. The rim well 3 is delimited in the axial direction on one side by an outer flange 7 and on the other side by an inner flange 8, which extend outward starting from the rim well 3 in the radial direction with respect to the longitudinal center axis 6. In addition, it is to be noted that the axial extension of the rim well 3 extends up to a respective exterior end of the outer flange 7 or the inner flange 8, respectively. The axial extension of the rim well 3 thus also includes the axial extensions of the outer flange 7 and the inner flange 8.

The rim well 3 and the hub 5 are connected to one another via the rim center 4. The rim center 4 thus engages both on the rim well 3 and also on the hub 5 and extends starting from the hub 5 up to the rim well 3. The hub 5 has a central recess, which is provided centrally in the hub 5 with respect to the longitudinal center axis 6. Additionally, the hub 5 has a bolt hole circle having multiple drilled holes, which are each used to accommodate a fastening means, by means of which the automobile rim 2 is fastenable or is fastened on a wheel hub of the motor vehicle. The rim center 4 preferably has multiple spokes (not shown here), which are arranged spaced apart from one another in the circumferential direction. Each of the spokes extends starting from the hub 5 up to the rim well 3.

The production of the automobile rim 2 is carried out with the aid of the device 1, which represents a casting tool. The device 1 has a casting mold 9, which is delimited, for example, on opposite sides by a first plate 10 and a second plate 11. In other words, the two plates 10 and 11 delimit the casting mold 9 in the axial direction with respect to the longitudinal center axis 6 on opposite sides. A slide 12 is arranged between the two plates 10 and 11, which delimits the casting mold 9 in the radial direction with respect to the longitudinal center axis 6. The plates 10 and 11 are preferably each displaceable in the axial direction with respect to the longitudinal center axis 6, whereas the slide 12 is displaceable in the radial direction. The slide 12 is preferably composed of multiple partial slides 13 and 14, which are displaceable independently of one another or are at least further displaceable from one another. Such a design of the device 1 enables simple demolding of the produced automobile rim 2.

For the die casting of the automobile rim 2, the casting material is supplied to the casting mold 9, preferably via a central runner channel 15. The casting material initially flows out of the runner channel 15 into that region of the casting mold 9 in which the hub 5 is formed. Subsequently, the casting material flows out of the hub 5 via the rim center 4 in the direction of the rim well 3. In this case, the casting material first reaches the outer flange 7 and subsequently flows through the rim well 3 up to the inner flange 8. This means that the casting material reaches the inner flange 8 last. After the inner flange 8 is reached by the casting material, the casting mold 9 is completely filled with the casting material.

To implement particularly reliable production of the automobile rim 2 with low discard rate, the casting material is to be post-compacted after its introduction into the casting mold 9. For this purpose, a compaction tool 16 is provided, which is provided in the exemplary embodiment shown here in the form of a ring projection 17. The ring projection 17 is formed continuously in the circumferential direction with respect to the longitudinal center axis 6 and completely encloses the longitudinal center axis 6 in the circumferential direction. The ring projection 17 is retracted into the casting mold 9 for the post-compaction of the casting material. For this purpose, it is preferably mounted displaceably on one of the plates 10 and 11, in the exemplary embodiment shown here on the plate 11, and is introduced thereby into the casting mold 9.

The compaction tool 16 is particularly preferably used for the post-compaction of the casting material in the region of the rim well 3 and/or—preferably—on the inner flange 8. The compaction tool 16 or the ring projection 17 is accordingly introduced in such a way into that region of the casting mold 9 in which the rim well 3 or the inner mandrel 8, respectively, is provided that a ring recess is embossed in the automobile rim 2, namely in the inner flange 8. The ring recess is to have borders on both sides here viewed in the radial direction, so that the ring recess is provided in particular like a groove in the end face of the automobile rim 2. Particularly effective post-compaction of the casting material is achieved in this way.

Using the described device 1, an extremely filigree appearance of the automobile rim 2 is implemented and at the same time a cost-effective and fast production thereof is enabled. Moreover, outstanding strength values are achieved by means of the die casting of the aluminum or the aluminum alloy, in particular due to the post-compaction of the casting material. It is to be noted that the device 1 is designed, for example, as a two-plate casting tool or as a three-plate casting tool. In addition to the illustrated plates 10 and 11, in the latter case a further plate can therefore be provided, which is arranged in particular on the side of the first plate 10 facing away from the second plate 11. For example, the runner channel 15 extends through the further plate or penetrates it completely.

LIST OF REFERENCE NUMERALS 1 device
2 automobile rim
3 rim well
4 rim center
5 hub
6 longitudinal center axis
7 outer flange
8 inner flange
9 casting mold
10 plate
11 plate
12 slide
13 partial slide
14 partial slide
15 runner channel
16 compaction tool
17 ring projection

The invention claimed is:

1. A method for producing an automobile rim from aluminum or an aluminum alloy for a wheel of a motor vehicle, wherein the automobile rim has a rim well delimited on opposite sides by an outer flange and an inner flange, a hub having a center recess and a bolt hole circle, and a rim center connecting the rim well and the hub to one another, the method comprising:
supplying a casting material to a casting mold via a central runner channel;
flowing the casting material from the central runner channel to the hub;
flowing the casting material from the hub via the rim center in a direction of the rim well;
flowing the casting material from the outer flange through the rim well to the inner flange; and
compacting the casting material when a proportion of the casting material which has a first temperature which is less than a solidus temperature of the casting material is less than a proportion of the casting material which has a second temperature which at least corresponds to the solidus temperature.

2. The method as claimed in claim 1, further comprising: retracting a compaction tool into the casting mold.

3. The method as claimed in claim 2, wherein a ring projection is used as the compaction tool.

4. The method as claimed in claim 3, wherein the ring projection is retracted into the casting mold in such a way that a ring recess with borders on both sides is formed in the automobile rim.

5. The method as claimed in claim 1, wherein the casting mold has a first outlet opening and a second outlet opening arranged spaced apart from the first outlet opening in an axial direction with respect to a longitudinal center axis of the automobile rim and the casting material can exit from the casting mold at each outlet opening.

6. The method as claimed in claim 5, further comprising: applying negative pressure to the casting mold during die casting at either the first outlet opening or the second outlet opening.

7. The method as claimed in claim 1, wherein die casting is carried out in such a way that the automobile rim has a low wall thickness of at most 15 mm.

8. The method as claimed in claim 1, wherein the rim center is formed having multiple spokes spaced apart from one another in a circumferential direction with respect to the longitudinal center axis of the automobile rim.

9. The method as claimed in claim 2, wherein the casting mold has a first outlet opening and a second outlet opening arranged spaced apart from the first outlet opening in an axial direction with respect to a longitudinal center axis of the automobile rim and the casting material can exit from the casting mold at each outlet opening.

10. The method as claimed in claim 3, wherein the casting mold has a first outlet opening and a second outlet opening arranged spaced apart from the first outlet opening in an axial direction with respect to a longitudinal center axis of the automobile rim and the casting material can exit from the casting mold at each outlet opening.

11. The method as claimed in claim 4, wherein the casting mold has a first outlet opening and a second outlet opening arranged spaced apart from the first outlet opening in an axial direction with respect to a longitudinal center axis of the automobile rim and the casting material can exit from the casting mold at each outlet opening.

12. The method as claimed in claim 1, wherein die casting is carried out in such a way that the automobile rim has a curvature having a low radius of curvature of at most 4 mm.

13. The method as claimed in claim 1, wherein die casting is carried out in such a way that the automobile rim has a demolding surface extending in the axial direction and in the radial direction.

14. The method as claimed in claim 1, wherein die casting is carried out in such a way that the automobile rim has a demolding surface extending in the axial direction and in the tangential direction with respect to the longitudinal center axis of the automobile rim, which lies completely in an imaginary plane, wherein the plane encloses an angle with the longitudinal center axis, which is greater than 0° and at most 4°.

* * * * *